Feb. 14, 1928.

P. T. ASARO 1,659,129

CHEMICAL FISH

Filed Aug. 12, 1927

INVENTOR

Philip T. Asaro

Patented Feb. 14, 1928.

1,659,129

UNITED STATES PATENT OFFICE.

PHILIP T. ASARO, OF SAN JOSE, CALIFORNIA.

CHEMICAL FISH.

Application filed August 12, 1927. Serial No. 212,528.

My invention relates to improvements in toy fishes, and the objects of my improvement are to provide a toy fish which will rise to the surface of the water, emit bubbles from the mouth in a lifelike manner, and then sink to the bottom of the bowl, presently to rise again in the same manner. Further objects are to provide a wax fish with bead eyes, means for balancing the fish, and means for making it rise and sink.

I attain these objects by the means illustrated in the accompanying drawings, in which—

Figure 1:
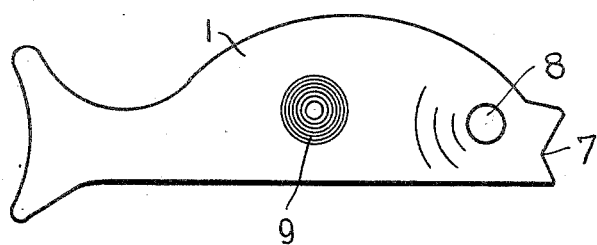
Figure 1 is a side view of the fish.
Figure 2:
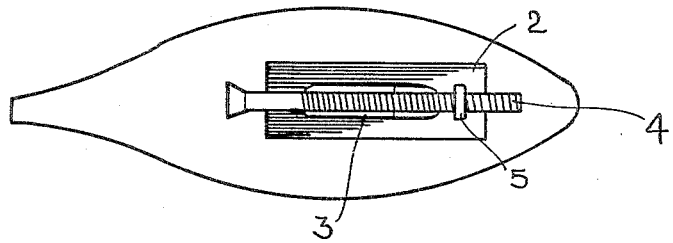
Fig. 2 is a bottom view.
Figure 3:
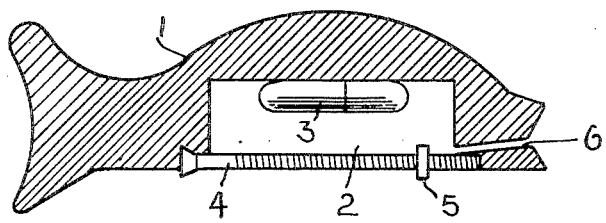
Fig. 3 is a longitudinal section.

Within the body of the fish 1 is a hollow space 2 into which is inserted a capsule 3 filled with tartaric acid mixed with an equal quantity of soda bicarbonate. The fish body is molded of wax, or constructed of other material light enough to float.

A bolt 4 with a nut 5 lies longitudinally along the bottom of the fish partly closing the opening into the hollow space 2. A small passageway 6 leads from the hollow space 2 to the mouth 7. A glass bead 8 embedded in the wax serves as an eye.

The buyant body of the fish 1 is given sufficient weight to sink it by the attachment of bolt 4. When, however, the capsule 3 is pricked a few times with a pin and inserted in the cavity 2, carbon dioxide is given off. The water is driven out of the cavity 2 and the fish rises to the surface. If the nut 5 is adjusted with care longitudinally, the gas will finally push its way out of the passageway 6, cause the nose of the fish to rise, and bubbles to issue in a most realistic manner from the mouth 7 of the fish. The fish, after the loss of gas, sinks again until more gas accumulates. Trade-mark 9 or advertising material may be placed upon the fish for commercial purposes.

I color my fish my mixing gold dust or other colored powder in the melted wax before molding. When not in the water, the fish may be used as a paper weight.

I claim:

A toy fish having a body constructed of light material, a bolt mounted longitudinally along the bottom of the fish of sufficient weight to sink it, an adjusting nut upon said bolt, a body cavity within which may be inserted a substance producing gas upon contact with water, a passageway leading from said cavity to the mouth of the fish.

In testimony whereof I hereby affix my signature.

PHILIP T. ASARO.